US006559196B2

(12) United States Patent
Narayan et al.

(10) Patent No.: US 6,559,196 B2
(45) Date of Patent: May 6, 2003

(54) TOUGH, FIRE RESISTANT POLYURETHANE FOAM AND METHOD OF MANUFACTURE THEREOF

(75) Inventors: Sujatha Narayan, Putnam, CT (US); Scott S. Simpson, Woodstock, CT (US)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 09/893,744

(22) Filed: Jun. 28, 2001

(65) Prior Publication Data

US 2002/0040978 A1 Apr. 11, 2002

Related U.S. Application Data

(60) Provisional application No. 60/214,502, filed on Jun. 28, 2000.

(51) Int. Cl.$^7$ .............................................. C08G 18/34
(52) U.S. Cl. ....................... 521/174; 521/170; 521/172; 521/173
(58) Field of Search ................................ 521/170, 174, 521/172, 173

(56) References Cited

U.S. PATENT DOCUMENTS

| | | | |
|---|---|---|---|
| 2,591,884 A | 4/1952 | Macripo | |
| 2,602,783 A | 7/1952 | Simon et al. | |
| 2,621,166 A | 12/1952 | Schmidt et al. | |
| 2,698,838 A | 1/1955 | Simon et al. | |
| 2,729,618 A | 1/1956 | Muller et al. | |
| 2,779,689 A | 1/1957 | Reis, Jr. | |
| 2,808,391 A | 10/1957 | Pattison | |
| 2,811,493 A | 10/1957 | Simon et al. | |
| 2,833,730 A | 5/1958 | Barthel, Jr. | |
| 2,834,748 A | 5/1958 | Bailey et al. | |
| 2,846,458 A | 8/1958 | Haluska | |
| 2,850,476 A | 9/1958 | Seeger et al. | |
| 2,866,744 A | 12/1958 | Askay et al. | |
| 2,866,762 A | 12/1958 | Brochagen et al. | |
| 2,868,824 A | 1/1959 | Haluska | |
| 2,870,097 A | 1/1959 | Pattison | |
| 2,877,212 A | 3/1959 | Seligman | |
| 2,878,601 A | 3/1959 | Bucmeister et al. | |
| 2,901,473 A | 8/1959 | Steinemann | |
| 2,911,390 A | 11/1959 | Smith | |
| 2,917,480 A | 12/1959 | Bailey et al. | |
| 2,921,915 A | 1/1960 | Brochhagen et al. | |
| 2,962,524 A | 11/1960 | Hostettler et al. | |
| 3,021,309 A | 2/1962 | Cox et al. | |
| 3,021,310 A | 2/1962 | Cox et al. | |
| 3,021,312 A | 2/1962 | Cox et al. | |
| 3,021,313 A | 2/1962 | Cox et al. | |
| 3,021,314 A | 2/1962 | Cox et al. | |
| 3,021,315 A | 2/1962 | Cox et al. | |
| 3,021,316 A | 2/1962 | Cox et al. | |
| 3,021,317 A | 2/1962 | Cox et al. | |
| 3,057,901 A | 10/1962 | Pleuddemann et al. | |
| 3,169,945 A | 2/1965 | Hostettler et al. | |
| 3,201,311 A | 8/1965 | Antonides et al. | |
| 3,383,351 A | 5/1968 | Stamberger | |
| 3,986,990 A | 10/1976 | Giolito | |
| 3,989,652 A | 11/1976 | Shim | |
| 4,022,718 A | 5/1977 | Russo | |
| 4,147,847 A | 4/1979 | Schweiger | |
| 4,162,353 A | 7/1979 | Papa et al. | |
| 4,212,953 A | 7/1980 | Sheratte et al. | |
| 4,275,172 A | 6/1981 | Barth et al. | 521/112 |
| 4,775,558 A | 10/1988 | Haas et al. | |
| 4,814,103 A | 3/1989 | Potter et al. | |
| 4,849,459 A | 7/1989 | Grace et al. | |
| 5,171,758 A | 12/1992 | Natoli et al. | 521/107 |
| 5,545,675 A | 8/1996 | Loy et al. | 521/172 |
| 5,670,554 A | * 9/1997 | Adams et al. | 521/131 |
| 5,674,567 A | 10/1997 | Kausch et al. | |
| 5,693,682 A | 12/1997 | Kuczynski et al. | 521/51 |
| 5,726,240 A | 3/1998 | Rosthauser et al. | |
| 5,733,945 A | 3/1998 | Simpson | |
| 6,022,903 A | 2/2000 | Younes et al. | 521/133 |
| 6,060,531 A | 5/2000 | Horn et al. | |

FOREIGN PATENT DOCUMENTS

GB 733624 7/1955

* cited by examiner

Primary Examiner—John M. Cooney, Jr.
(74) Attorney, Agent, or Firm—Cantor Colburn LLP

(57) ABSTRACT

Compositions for the formation of temperature resistant, tough, flame retardant polyurethane foams, comprising a low VOC polyisocyanate component wherein the isocyanate is a low functionality isocyanate; a low VOC active-hydrogen containing component substantially reactive with the low functionality isocyanate to form a polyurethane; a surfactant composition; and a catalyst component, wherein the total mass loss of the foam is less than 1% by weight as measured by ASTM E595. The foams are useful as gasketing materials, for example.

49 Claims, No Drawings

TOUGH, FIRE RESISTANT POLYURETHANE FOAM AND METHOD OF MANUFACTURE THEREOF

CROSS REFERENCE TO RELATED APPLICATION

This application claims priority to U.S. application Ser. No. 60/214,502, filed Jun. 28, 2000, which is fully incorporated herein by reference.

BACKGROUND OF THE INVENTION

1. Field of the Invention

This invention relates generally to polyurethane foams. More particularly, this invention relates to tough, fire resistant, temperature resistant polyurethane foams with low fogging and low outgassing.

2. Brief Description of the Prior Art

Fire resistant polyurethane foams are useful materials for a wide variety of applications, particularly in the automotive and electronic industries. Such foams preferably have densities in the range from about 10 to about 50 pounds per cubic feet (pcf). It is also important that the foams have acceptable compression set, abrasion resistance, flex resistance, and tear strength. Another important characteristic is low fogging and outgassing, which is especially desirable in automotive applications. While a number of prior art foams meet the above requirements, such as the PORON® polyurethane foams sold by Rogers Corp., Rogers, Conn., it has heretofore been difficult to impart good or excellent toughness, temperature resistance, and flame resistance to such foams, without also increasing fogging and outgassing.

One flame resistance standard often specified for automotive applications is FMVSS (Federal Motor Vehicle Safety Standard) 302.

It is known in the prior art that the fire resistance of polyurethane foams can be increased by chemical incorporation of phosphorus compounds into the foams. Thus, for example, U.S. Pat. No. 3,986,990 discloses polymerizing polyalkylene glycol alkyl polyphosphites with or without additional polyols, with selected isocyanates, thereby producing polyurethane foams in which these polyphosphites are chemically incorporated into the polyurethane network. U.S. Pat. No. 3,989,652 discloses the preparation and subsequent incorporation of polyalkylene glycol alkyl or haloalkyl polyphosphonates into the polyurethane polymer chain by chemical bonds.

In the above prior art, the attachment is chemical via a reaction between the isocyanate and an active hydrogen which is part of the phosphorus-containing molecule. This results in incorporation of the phosphorus atom into the main polymer backbone, which leads to loss of commercially attractive properties, such as softness and resilience in flexible foams, and lack of friability in rigid foams. Susceptibility to hydrolysis is also increased for both rigid and flexible foams. These problems are so acute for flexible foams that present commercial practice is to introduce the phosphorus in a non-reactive form, e.g., as tris-(2-chloroethyl phosphate). This results in a small degree of plasticizing, but disadvantageously, the fire retardant is simply dissolved in the foam polymer, where it contributes to fogging and/or outgassing. It may also diffuse out, in which case fire retardance is lost.

The preparation of low density, flexible polyurethane flame-retardant foam compositions is also described in U.S. Pat. No. 4,022,718, which teaches the preparation of high resilience cold-cured polyurethane foams incorporating 2,3-dibromo-1,4-butenediol as a chain extender and flame-retardant component. U.S. Pat. No. 4,147,847 teaches a method of preparing flexible, flame-retardant, polyurethane foams by employing specific foam stabilizers, which reduce the required amount of normal flame-retardant additives. U.S. Pat. No. 4,162,353 teaches the preparation of flexible polyurethane foams incorporating therein a halo-substituted alkyl phosphate such as tris(2-chloroethyl)-phosphate and an unsubstituted trialkylphosphate such as triethylphosphate. U.S. Pat. No. 4,849,459 describes a flame retardant flexible polyurethane foam comprising the reaction product of a polyether polyol and a toluene diisocyanate and incorporating melamine and another flame retardant. Each of the foregoing is incorporated herein by reference.

While suitable for their intended purposes, the above-described flexible polyurethane foams do not have the requisite combinations of high temperature resistance and toughness, as reflected by tensile strength, elongation, tear strength, abrasion resistance, and/or flex resistance, in combination with flame retardance and low fogging and low outgassing. Because of these deficiencies, these prior art foams are not suitable for use in the automotive industry for example, as interior gaskets, seals, and cup holders. Consequently, there remains a need for low fogging, low outgassing polyurethane foam compositions that are flame retardant, i.e., which pass FMVSS 302 burn testing, and yet which are also temperature resistant and tough.

SUMMARY OF THE INVENTION

The above-discussed and other drawbacks and deficiencies of the prior art are overcome or alleviated by compositions for the formation of temperature resistant, tough, flame retardant polyurethane foams, comprising
- a low VOC polyisocyanate component wherein the isocyanate is a low functionality isocyanate;
- a low VOC active-hydrogen containing component substantially reactive with the low functionality isocyanate to form a polyurethane;
- a surfactant composition; and
- a catalyst component, wherein the total mass loss of the foam is less than 1% by weight as measured by ASTM E595.

The composition may furthermore optionally comprise a low VOC antioxidant composition to improve temperature resistance. Preferably, the composition further comprises a flame retardant filler, even more preferably a non-halogenated, low VOC flame retardant filler. Preferably, each of the foregoing components is low VOC, (i.e., has a low concentration of volatile organic components), and the formed foam is overprinted with a low VOC, nonfogging, UV-curable acrylic composition. Such foams pass FMVSS 302 burn testing, even in the absence of known halogenated or phosphorus-based flame retarding agents. The foams have excellent physical properties, in addition to temperature resistance, flame retardance, low fogging, and low outgassing. In particular, the foams are tough, as reflected by high tensile strengths and high elongations relative to the CFD (compressive force deflection, or "modulus").

Because of the foregoing numerous features and advantages, the materials described herein are especially suitable for use as interior gaskets, seals, and cup holders for automotive and other electronic applications. The above discussed and other features and advantages will be appreciated and understood by those skilled in the art from the following detailed description.

DESCRIPTION OF THE PREFERRED EMBODIMENTS

A composition for the formation of a flame retardant, yet tough polyurethane foam having low outgassing and low fogging consists essentially of

- a low VOC organic polyisocyanate component, wherein the polyisocyanate component is a low functionality polyisocyanate,
- a low VOC active-hydrogen containing component substantially reactive with the low functionality isocyanate to form a polyurethane,
- a surfactant composition for structurally stabilizing the froth produced according to step (2) below, during the period that said froth is in the liquid phase and until said froth is cured; and
- a catalyst having substantial catalytic activity in the curing of said mixture.

The process of forming the foam comprises forming the above-described composition; substantially uniformly dispersing inert gas throughout the mixture by mechanical beating of the mixture to form a heat curable froth which is substantially structurally and chemically stable, but workable at ambient conditions; and curing said froth to form a cured foam.

As may be seen by reference to the related art discussed above, it has been heretofore difficult to obtain low outgassing foams that are also tough. It has furthermore been thought that high levels of flame resistance could be imparted to polyurethane foams only by use of known halogenated and phosphorus-based flame retarding agents, which contribute to fogging and outgassing problems. The inventors hereof have unexpectedly discovered that tough, low outgassing foams may be achieved by the combination of a low functionality isocyanate and low VOC components; and that such foams may be rendered highly flame retardant by use of a non-halogenated, preferably low VOC flame retardant filler. As used herein, "low VOC" refers to compounds having low (2% or less by weight) volatile organic compound levels. Volatile organic compounds as used herein refers to compounds capable of being driven off as a vapor at room temperature or slightly elevated temperatures, e.g., up to about 120° F.

The organic polyisocyanate components preferably are those having the general formula:

$$Q(NCO)_i$$

wherein i is an integer of two or more and Q is an organic radical having the valence of i. In an important feature of the present composition, the average value of i is low, i.e., in the range from 2 to 2.25, inclusive. Use of polyisocyanates having a low functionality (in conjunction with the polyol component described below) unexpectedly results in improved toughness for the cured polyurethane foams.

Q can be a substituted or unsubstituted hydrocarbon group (i.e., an alkylene or an arylene group). Q can be a group having the formula $Q^1$-Z-$Q^1$ wherein $Q^1$ is an alkylene or arylene group and Z is —O—, —O-$Q^1$-, —CO—, —S—, —S-$Q^1$-S—, or —$SO_2$—. Examples of such compounds include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4,4',4"-triisocyanate, and isopropylbenzene-alpha-4-diisocyanate.

Q can also represent a polyurethane radical having a valence of i in which case $Q(NCO)_i$ is a composition conventionally known as a prepolymer. Such prepolymers are formed by reacting a stoichiometric excess of a polyisocyanate as set forth hereinbefore and hereinafter with an active hydrogen-containing component as set forth hereinafter, especially the polyhydroxyl-containing materials or polyols described below. Usually, for example, the polyisocyanate is employed in proportions of from about 30 percent to about 200 percent stoichiometric excess, the stoichiometry being based upon equivalents of isocyanate group per equivalent of hydroxyl in the polyol.

While the aforementioned isocyanates wherein i has a valence of two, for example 4,4'-diphenyl methane diisocyanate (MDI), may have been mentioned in the related art as being preferred for use in the formation of polyurethane foams, those of ordinary skill in the art are aware that commercial formulations of such isocyanates typically have an average value of i of 2.3 and above. Higher average values of i have heretofore generally been used for ease of handling and/or cost. It has unexpectedly been discovered by the inventors hereof that restricting the average value of i to 2.0 to 2.25, inclusive, results in foams with a variety of desirable properties, including toughness. A preferred polyisocyanate is a polymeric diphenyl methane diisocyanate having an average value of i of 2.2 and a percent NCO of 27.6. This polyisocyanate is available from Bayer under the trade name BAYTUFT 751 and Baytuft 757.

The amount of polyisocyanate employed will vary slightly depending upon the nature of the polyurethane being prepared. In general, the total—NCO equivalent to total active hydrogen equivalent should be such as to provide a ratio of 0.8 to 1.2 equivalents of—NCO per equivalent of active hydrogen, e.g., hydroxyl hydrogen, of the active hydrogen reactant, and preferably a ratio of about 1.0 to 1.05 equivalents of—NCO per active hydrogen.

The active hydrogen-containing component generally includes a mixture of polyhydroxyl-containing compounds, such as hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,878,601); hydroxyl-terminated polyesters (U.S. Pat. Nos. 2,698,838, 2,921,915, 2,591,884, 2,866,762, 2,850,476, 2,602,783, 2,729,618, 2,779,689, 2,811,493, and 2,621,166); hydroxymethyl-terminated perfluoromethylenes (U.S. Pat. Nos. 2,911,390 and 2,902,473); polyalkylene ether glycols (U.S. Pat. No. 2,808,391; British Pat. No. 733,624); polyalkylene ether glycols (U.S. Pat. No. 2,808, 391; British Pat. No. 733,624); polyalkylenearylene ether glycols (U.S. Pat. No. 2,808,391); and polyalkylene ether triols (U.S. Pat. No. 2,866,774).

Especially preferred polyhydroxyl-containing materials are the polyether polyols obtained by the chemical addition of alkylene oxides, such as ethylene oxide, propylene oxide and mixtures thereof, to water or polyhydric organic compounds, such as ethylene glycol, propylene glycol, trimethylene glycol, 1,2-butylene glycol, 1,3-butanediol, 1,4-butanediol, 1,5 -pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1, 1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2- hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy) methyl]-ethane, 1,1,1-tris[2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac resins, and the like. The alkylene oxides employed in producing polyoxyalkylene polyols normally have from 2 to 4 carbon atoms. Propylene oxide and mixtures or propylene oxide with ethylene oxide are preferred. The polyols listed above can be used per se as the active hydrogen compound.

A preferred class of polyether polyols is represented generally by the following formula

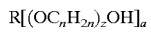

R[(OC$_n$H$_{2n}$)$_z$OH]$_a$ wherein R is hydrogen or a polyvalent hydrocarbon radical; a is an integer (i.e., 1 or 2 to 6 to 8) equal to the valence of R, n in each occurrence is an integer from 2 to 4 inclusive (preferably 3) and z in each occurrence is an integer having a value of from 2 to about 200, preferably from 15 to about 100.

Another type of active hydrogen-containing material, filled polyether polyols, are represented by the polyurea polyols or the polyhydrazodicarbonamide polyols. These are produced in the polyol in situ by reaction with diisocyanate and diamine, which combine to form polyurea polyols by polyaddition; or by reaction with diisocyanate and hydrazine, which combined to form polyhydrazodicarbonamide polyols. In part, combination with the hydroxyl groups of the polyether chain takes place in this process. The stable dispersions obtained in this manner are known as PHD polyethers, wherein PHD stands for substance of the following repeat unit:

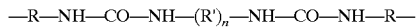

—R—NH—CO—NH—(R')$_n$—NH—CO—NH—R—

Still another type of active hydrogen-containing materials are grafted polyether polyols, obtained by polymerizing ethylenically unsaturated monomers in a polyol as described in U.S. Pat. No. 3,383,351, the disclosure of which is incorporated herein by reference. Suitable monomers for producing such compositions include acrylonitrile, vinyl chloride, styrene, butadiene, vinylidene chloride and other ethylenically unsaturated monomers as identified and described in the above-mentioned U.S. patent. Suitable polyols include those listed and described hereinabove and in the U.S. patent. The polymer polyol compositions can contain from 1 to about 70 weight percent (wt %), preferably about 5 to about 50 wt %, and most preferably about 10 to about 40 wt % monomer polymerized in the polyol. Such compositions are conveniently prepared by polymerizing the monomers in the selected polyol at a temperature of 40° C. to 150° C. in the presence of a free radical polymerization catalyst such as peroxides, persulfates, percarbonate, perborates and azo compounds.

Additional active hydrogen-containing compounds are the polymers of aromatic esters, aliphatic esters and cyclic esters. Aromatic esters are typically an orthophthalate-diethylene glycol polyester polyol such as Stepanpol® PS 20-200A, Stepanpol® PS2402 and Stepanpol® PD-200LV from Stepan Company. Aliphatic esters are typically made from diethylene glycol and adipic acid, such as Lexorez® 1100-220 from Inolex chemical company and Fomrez 11-225 from Witco Corporation. The preparation of the cyclic ester polymers from at least one cyclic ester monomer is well documented in the patent literature as exemplified by U.S. Pat. Nos. 3,021,309 through 3,021,317; 3,169,945; and 2,962,524. Suitable cyclic ester monomers include but are not limited to delta-valerolactone; epsilon-caprolactone; zeta-enantholactone; the monoalkyl-valerolactones, e.g., the monomethyl-, monoethyl-, and monohexyl-valerolactones.

Cyclic ester/alkylene oxide copolymers can also be prepared by reacting a mixture comprising cyclic ester and alkylene oxide monomers, an interfacial agent such as a solid, relatively high molecular weight poly(vinylstearate) or lauryl methacrylate/vinyl chloride copolymer (reduced viscosity in cyclohexanone at 30° C. from about 0.3 to about 1.0), in the presence of an inert normally-liquid saturated aliphatic hydrocarbon vehicle such as heptane and phosphorus pentafluoride as the catalyst therefor, at an elevated temperature, e.g., about 80° C.

Preferred active hydrogen-containing components are polyol mixtures comprising polyether polyols and polyester polyols. Preferred polyether polyols include polyoxyalkylene diols and triols, and polyoxyalkylene diols and triols with polystyrene and/or polyacrylonitrile grafted onto the polymer chain, and mixtures thereof. Preferred polyester polyols are based on caprolactone. In particular, the polyol components are formulated to yield a wide range of moduli. Chain extenders and crosslinking agents may further be included, to the extent that such chain extenders and cross-linking agents are low VOC. Exemplary chain extenders and cross-linking agents are low molecular weight diols, such as alkane diols and dialkylene glycols, and/or polyhydric alcohols, preferably triols and tetrols, having a molecular weight from about 80 to 450. The chain extenders and cross-linking agents are used in amounts from 0.5 to about 20 percent by weight, preferably from 10 to 15 percent by weight, based on the total weight of the polyol component.

In one preferred embodiment, the polyol component comprises one or a mixture of an ethylene oxide capped polyether oxide diol having a molecular weight in the range from about 2000 to about 3500; one or a mixture of a polyether oxide diol having a molecular weight in the range from about 1000 to about 3000, one or a mixture of a polyester diol having a molecular weight in the range from about 400 to about 600.

In one preferred embodiment, the polyol component comprises one or a mixture of a polyester diol having a molecular weight in the range from about 400 to about 600, and one or a mixture of a polyether diol having polystyrene and polyacrylonitrile grafts and having a molecular weight in the range from about 1500 to about 4000.

In one preferred embodiment, the polyol component comprises one or a mixture of a low molecular weight diol, including but not being limited to 3-methyl-1,5-pentanediol and 2-methyl-1,3-propanediol; one or a mixture of a polypropylene oxide diol having a molecular weight in the range from about 500 to about 2000; one or a mixture of a polypropylene oxide diol having a molecular weight in the range from about 2000 to about 4000; one or a mixture of a polycaprolactone-based diol having a molecular weight in the range from about 400 to about 600.

In a particularly preferred embodiment, the polyol component comprises one or a mixture of a low molecular weight diol having a molecular weight in the range from about 50 to about 250; one or a mixture of a polyether oxide diol having a molecular weight in the range from about 1500 to about 4000, one or a mixture of a polyester diol having a molecular weight in the range from about 400 to about 600, and one or a mixture of a polyether triol having polystyrene and polyacrylonitrile grafts and having a molecular weight in the range from about 1500 to about 4000.

The polyol or polyol mixture can have hydroxyl numbers that vary over a wide range. In general, the hydroxyl numbers of the polyols or mixtures thereof, including other cross-linking additives, if employed, can be in the range from about 28 to about 1250, and higher, preferably from about 45 to about 200. The hydroxyl number is defined as the number of milligrams of potassium hydroxide required for the complete neutralization of the hydrolysis product of the fully acetylated derivative prepared from one gram of polyol or mixtures of polyols with or without other cross-linking additives used in the invention. The hydroxyl number can also be defined by the equation:

$$OH = \frac{56.1 \times 1000 \times f}{M.W.}$$

wherein OH is the hydroxyl number of the polyol, $f$ is the average functionality, that is average number of hydroxyl groups per molecule of polyol, and M.W. is the average molecular weight of the polyol.

The exact polyol or polyols employed depends upon the end-use of the polyurethane foam. In particular, variation in the polyol component can yield a wide range of moduli and toughness. The molecular weight and the hydroxyl number are selected properly to result in flexible foams. The polyol or polyols including cross-linking additives, if used, preferably possesses a hydroxyl number of from about 28 to about 1250 or more when employed in flexible foam formulations. Such limits are not intended to be restrictive, but are merely illustrative of the large number of possible combinations of the polyols that can be employed.

A wide variety of surfactant compositions can be employed for purposes of stabilizing the froth, organosilicone surfactants being preferred. A preferred organosilicone surfactant is a copolymer consisting essentially of $SiO_2$ (silicate) units and $(CH_3)_3SiO_{0.5}$ (trimethylsiloxy) units in a molar ratio of silicate to trimethylsiloxy units of about 0.8:1 to about 2.2:1, preferably about 1:1 to about 2.0:1. Another preferred organosilicone surfactant stabilizer is a partially cross-linked siloxane-polyoxyalkylene block copolymer and mixtures thereof wherein the siloxane blocks and polyoxyalkylene blocks are linked by silicon to carbon, or by silicon to oxygen to carbon, linkages. The siloxane blocks are comprised of hydrocarbon-siloxane groups and have an average of at least two valences of silicon per block combined in said linkages. At least a portion of the polyoxyalkylene blocks are comprised of oxyalkylene groups and are polyvalent, i.e., have at least two valences of carbon and/or carbon-bonded oxygen per block combined in said linkages. Any remaining polyoxyalkylene blocks are comprised of oxyalkylene groups and are monovalent, i.e., have only one valence of carbon or carbon-bonded oxygen per block combined in said linkages. Additionally, conventional organopolysiloxane-polyoxyalkylene block copolymers such as those described in U.S. Pat. Nos. 2,834,748; 2,846,458; 2,868,824; 2,917,480; and 3,057,901 can be employed. The amount of the organosilicone polymer employed as a foam stabilizer in this invention can vary over wide limits, e.g., from about 0.5 weight parts to 10 weight parts or greater, per hundred weight parts of the active hydrogen component. Preferably, the amount of organosilicone copolymer present in the foam formulations varies from about 1.0 weight parts to about 6.0 parts on the same basis.

Catalysts include various inorganic metal compounds and metal compounds that include certain organic groups. Metal acetyl acetonates are preferred, based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. A common catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine) diacetyl acetylacetonato nickel, and the like. Ferric acetylacetonate is particularly preferred, due to its relative stability, good catalytic activity, and lack of toxicity. The metal acetylacetonate is most conveniently added by pre-dissolution in a suitable solvent such as dipropylene glycol or other hydroxyl containing compound which will then participate in the reaction and become part of the final product.

Added to the metal acetyl acetonate is acetyl acetone (2,4-pentanedione), as disclosed in commonly assigned U.S. Pat. No. 5,733,945 to Simpson, which is incorporated herein by reference. It has been discovered that the acetyl acetone can be used to delay or inhibit the normally reactive metal acetyl acetonate at the lower temperatures needed to achieve proper mixing and casting. In other words, the acetyl acetone provides heat latency, which allows time for the required mixing, casting and other procedures, and avoids deleterious premature curing during low temperature processing. However, as the material is cured in the several heating zones and the temperature of the urethane mixture rises, the acetyl acetone is driven off. With the acetyl acetone removed together with its associated delaying function, the metal acetyl acetonate is allowed to resume its normally high reactivity and provide a very high level of catalysis at the end of the polyurethane reaction. This high reactivity late in the processing cycle is advantageous and provides improved physical properties such as compression set. In general, the ratio of metal acetyl acetonate to acetyl acetone is about 2:1 on a weight basis. The amount of catalyst present in the liquid phase is preferably in the range of 0.01 to 1.0 weight parts per hundred weight parts of the active hydrogen compound.

Optional, but preferred components include flame retardant fillers and anti-oxidant compositions. Instead of the halogenated and/or phosphorus-based flame retardant additives commonly used in the art, which can cause fogging and outgassing, flame resistance is preferably imparted to the cured compositions by use of a combination of low VOC components and a flame retardant filler. Suitable flame retarding fillers include, for example, melamine cyanurate, alumina trihydrate, or a combination comprising one of the foregoing. The filler is present in an effective amount, which is readily determined by one of ordinary skill in the art based on the degree of flame resistance, processability of the formulation, and desired foam properties. Effective quantities will generally be in the range from about 10 to about 40 weight percent of the non-isocyanate containing component mixture (i.e., the "polyol component" shown in Table 2 below).

In an unexpected feature, appropriate selection of anti-oxidant yields improved high temperature resistance together with low fogging and outgassing. BHT, for example, is a commonly used antioxidant, which is a solid at room temperature, but which sublimes at slightly elevated temperatures, hence outgasses. When replaced with phenolic and amine-based antioxidant combination packages, such as those available under the trade names IRGANOX 1135 and IRGANOX 5057 available from Ciba Specialty Chemicals, high temperature resistance is improved while decreasing fogging and outgassing. Effective quantities are of from about 0.05 to about 0.25 weight percent of IRGANOX 1135 antioxidant and from about 0.005 to about 0.07 weight percent of IRGANOX 5057, preferably from about 0.07 to about 0.10 weight percent of IRGANOX 1135 and preferably from about 0.015 to about 0.03 weight percent of the polyol component.

Other, optional additives may be added to the polyurethane froth mixture in the manufacturing process. For example, conventionally used additives such as other fillers (silica, talc, calcium carbonate, clay, and the like), dyes, pigments (for example titanium dioxide and iron oxide) and the like can be used. Use of hindered amine light stabilizers further imparts UV resistance.

Small amounts of an auxiliary blowing agent can be employed. For example, high boiling fluorocarbons, e.g., boiling above about 40° C. can be used. Specific fluorocarbons include for example 1,1,2-trichloro-1,2,2-trifluoroethane and isomers of tetrachlorodifluoroethane, tetrachloromonofluoroethane, and the like. Other auxiliary blowing agents, such as small amounts of water, although not necessary, can be employed for purposes of providing an added expansion during heat curing in those cases where such added expansion is desired.

The gas phase of the novel froths is most preferably air because of its cheapness and ready availability. However, if desired, other gases can be used which are gaseous at ambient conditions and which are substantially inert or non-reactive with any component of the liquid phase. Such other gases include, for example, nitrogen, carbon dioxide and even fluorocarbons, which are normally gaseous at ambient temperatures. The inert gas is incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation preferably is conducted at pressures not greater than 100 to 200 p.s.i.g. It is significant, however, to note that conventional, readily available, mixing equipment is used and no special equipment is necessary. The amount of inert gas beaten into the liquid phase should be adequate to produce froth of the desired density. The mechanical beating is conducted over a period of a few seconds in an Oakes mixer, or of 3 to 30 minutes in a Hobart mixer, or however long it takes to obtain the desired froth density in the mixing equipment employed.

The froth as it emerges from the mechanical beating operation is substantially chemically stable and is structurally stable but easily workable at ambient temperatures, e.g., about 10° C. to about 40° C. The density of the cured foams is generally in the range from about 10 to about 50 pcf, preferably from about 12 to about 30 pcf.

In a preferred feature, the foams formed from the above-described compositions are flame resistant, having a UL-94 rating of HBF, and/or passing MVSS No. 302. The foams are low fogging as measured in accordance with SAE J1756, and low outgassing, as measured in accordance with ASTM E595, i.e., the foams lose less than 1% of their weight when held at 125° C. for 24 hours, and preferably less than 0.8% of their weight.

The foams are tough, as reflected by high elongations relative to the modulus, as reflected by 25% CFD, high tensile strengths, high elongation, and high tear strength. Preferred values for CFD. Toughness is also reflected by high tensile and tear strengths are set forth below:

| Property | Range 1 | Range 2 | Range 3 | Range 4 | Range 5 |
|---|---|---|---|---|---|
| 25% CFD, (psi) | 1–4 | 4–8 | 8–12 | 16–20 | 30–60 |
| Tensile strength, (psi) | >25 | >75 | >105 | >150 | >280 |
| Elongation, % | >200 | >170 | >160 | >140 | >80 |
| Tear strength, (pli) | >7 | >7 | >12 | >15 | >25 |

The cured product is preferably overprinted with a UV-curable acrylic composition to prevent material from sticking to itself during manufacture and/or use.

The foams produced from these compositions are useful for example in the vehicle industry, for example in the automotive, aircraft, and shipbuilding industries, and in the refrigeration and construction industries for foam filling and foam backing of cavities, for example boards and control panels, as interim layers for sandwich elements or for foam filling refrigerator and freezer casings. The polyurethane foams are also suitable as seals and gaskets, for vibration damping, and as insulation materials, for example as a lagging for piping or heating systems, and as wall linings, housing parts, cushion materials, armrests, headrests, device safety covers, and central consoles.

The polyurethane foams are further described by the following non-limiting examples:

EXAMPLES

Chemicals, sources, and descriptions are listed in Table 1 below.

TABLE 1

| Trade Name | Source | Description |
|---|---|---|
| E351 | Bayer | Ethylene oxide capped polypropylene oxide diol, MW = 2800 |
| 1652 | Bayer | Polypropylene oxide triol, MW = 3000 |
| PPG 425 | Bayer | Polypropylene oxide diol, MW = 450 |
| PPG 1025 | Bayer | Polypropylene oxide diol, MW = 1000 |
| PPG 2000 | Bayer | Polypropylene oxide diol, MW = 2000 |
| MPDiol | Bayer | 2-Methyl-1,3-propane diol (chain extender) |
| MPTD | Kuraray | 3-Methyl-1,5-pentane diol (chain extender) |
| Niax 24-32 | Bayer | Polypropylene oxide diol with polystyrene and polyacrylonitrile grafts, MW = 2800 |

TABLE 1-continued

| Trade Name | Source | Description |
|---|---|---|
| TONE 0201 | Union Carbide | Polycaprolactone-based polyester diol, MW = 500 |
| DPG | — | Dipropylene glycol (diol chain extender) |
| NIAX 34-35 | Bayer | Polypropylene oxide triol with polystyrene and polyacrylonitrile grafts, MW = 3000 (polymer polyol) |
| MULTRANOL 9151 | Bayer. | Polyurea triol, MW = 6000 |
| L-5617 | Crompton/Osi | Silicone-based surfactant |
| Alumina | — | Aluminum trihydrate (flame retardant filler) |
| 3A Sieves | — | Alkali metal alumino silicate, $K_{12}[(AlO_2)_{12}(SiO_2)_{12}]XH_2O$ (water absorption) |
| IRGANOX 1135 | Ciba | Hindered phenol (antioxidant) |
| IRGANOX 5057 | Ciba | Aromatic amine (antioxidant) |
| BHT | — | Butylated hydroxytoluene (antioxidant) |
| Pigment | PAN Chemical | Colorant, in 34–45 polyol |
| Catalyst | — | Ferric acetyl acetonate and acetyl acetone in polyol |
| Papi 901 | DOW Chemical | Polymeric diphenyl methane diisocyanate, % NCO = 31.6, Average Functionality = 2.3 |
| BAYTUFT 751 | Bayer | Polymeric diphenyl methane diisocyanate, % NCO = 27.6, Average Functionality = 2.2 |
| BAYTUFT 757 | Bayer | Polymeric diphenyl methane diisocyanate, % NCO = 27.6, Average Functionality = 2.2 |
| Mondur PF | Bayer | Modified diphenyl methane diisocyanate, % NCO = 23.0, Average Functionality = 2.0 |
| MDI 143L | DOW Chemical | Carbodiimide based diphenyl methane diisocyanate, % NCO = 30.8, Average Functionality = 2.15 |
| PAPI 901 | Dow Chemical Co. | Polymeric diphenyl methane diisocyanate, % NCO = 31.6, Average Functionality = 2.3 |
| Baytuft 752 | Bayer Corp. | Polymeric diphenyl methane diisocyanate, % NCO = 27.0, Average Functionality = 2.35 |

Polyurethane foams having the compositions set forth in Table 2 and 3 below were formulated as follows. All components (active hydrogen component, catalyst and additives (Part A) were mixed and placed in a holding tank with agitation and under dry nitrogen. This mixture was then pumped at a controlled flow rate to a high shear Oakes-type mixing head. The isocyanate (Part B) was separately pumped into the mixing head. Dry air was introduced into the mixing head using a Matheson gas flow rate controller to adjust the flow so that the cured material had the desired density, generally about 20 pcf. After mixing and foaming, the composition was cast onto coated release paper that had been dried by passing it through a high air flow oven at 275–300° F. just prior to the point where the foam was introduced. The cast foam was then passed under a knife over roll (KOR) coater to spread the foam to the desired thickness. The cast foam was then passed through heated platens (400° F. upper, 250–375° C. lower) to cure, and cooled. The foams thus synthesized were tested as follows.

Modulus as reflected by compression force deflection (CFD) was determined on an Instron using 2-inch by 2-inch die-cut samples stacked to a minimum of 0.250 inches, usually about 0.375 inches and a 20,000 pound cell mounted in the bottom of the Instron. CFD was measured by calculating the force in pounds per square inch (psi) required to compress the sample to 25% of the original thickness.

Tensile strength and elongation were measured using an Instron fitted with a 50-pound load cell and using 10–20 pound range depending on thickness and density. Tensile strength (psi) is calculated as the amount of force per inch of width at the break divided by the sample thickness. Elongation is reported as percent extension at break.

Tear strength was measured using an Instron fitted with a 50-pound load cell and using a 2, 5, or 10-pound load range depending on sample thickness and density. Tear strength is calculated by dividing the force applied at tear by the thickness of the sample.

Temperature resistance was measured by the percent loss in CFD after exposure to 140 degrees centigrade for 22 hours.

Outgassing was measured by ASTM E595 or by determining the percent weight loss of a sample held at 125° C. for 24 hours.

Fogging was measured in accordance with SAE J1756 (100° C. for 3 hours).

Flame resistance was measured in accordance with FMVSS 302.

Table 2 compares examples of the present invention with prior art examples, wherein the prior art samples are low in outgassing and flammability, but also have lower toughness and temperature resistance.

TABLE 2

| | Sample No. | | | | | | | | |
|---|---|---|---|---|---|---|---|---|---|
| Component | 1 | 2* | 3 | 4* | 5 | 6* | 7 | 8* | 9 |
| Polyol Side | | | | | | | | | |
| E351 | 23.93 | | | | | | | | |
| 1652 | | | | | | | | | 36.69 |
| PPG 1025 | | | | | | | | | 12.8 |
| PPG 2025/PPG 2000 | 36.3 | | | | 28.67 | | 27.4 | | |

TABLE 2-continued

| Component | 1 | 2* | 3 | 4* | 5 | 6* | 7 | 8* | 9 |
|---|---|---|---|---|---|---|---|---|---|
| MPDiol | | | | | | | | | 1.9 |
| MPTD | | | | | | | | | 11.25 |
| Niax 24-32 | | | 40.82 | | | | | | |
| TONE 0201 | 10.8 | | 10.8 | | 10.8 | | 10.8 | | 10.8 |
| DPG | | | | | 7.5 | | 10.8 | | |
| Catalyst | 3.33 | | 3.33 | | 3.33 | | 3.33 | | 3.33 |
| NIAX34-45 | 2.9 | | 18.16 | | 25 | | 22.8 | | |
| L-5617 | 2.7 | | 2.7 | | 2.7 | | 2.7 | | 2.7 |
| Alumina | 20.1 | | 20.1 | | 20.1 | | 20.1 | | 20.1 |
| 3A Sieve | 2 | | 2 | | 2 | | 2 | | 2 |
| IRGANOX 1135 | 0.12 | | 0.12 | | 0.12 | | 0.12 | | 0.12 |
| IRGANOX 5057 | 0.03 | | 0.03 | | 0.03 | | 0.03 | | 0.03 |
| Pigment | 6.78 | | 9.54 | | 9.54 | | 9.88 | | 9.91 |
| Total Parts | | 106.5 | 109.6 | 109.8 | 109.8 | 109.8 | 109.9 | 109.8 | 111.6 |
| Isocyanate | | | | | | | | | |
| Papi 901 | | 17.73 | | 27.54 | | 33.78 | | 46.88 | |
| 751A | 16.33 | | 27.6 | | 32.67 | | 39.74 | | 52.62 |
| OH# | 55.1 | 68.8 | 62.2 | 103.7 | 109.5 | 127.1 | 133.1 | 176.5 | 173.5 |
| Mc | 14881 | 7847 | 9737 | 5181 | 5698 | 4400 | 5195 | 2797 | 4025 |
| Typical Properties | | | | | | | | | |
| Thickness, mm (mils) | (125) | (125) | 125 | 125 | 125 | 125 | 125 | 125 | 125 |
| Density, (pet) | 20 | 20 | 20 | 20 | 20 | 20 | 20 | 20 | 20 |
| CFD, (psi) | 2.6 | 5.5 | 5.5 | 10 | 10 | 18 | 18 | 55 | 55 |
| Tensile strength, (psi) | 30 | 53 | 91 | 102 | 115 | 147 | 189 | 273 | 292 |
| Elongation % | 251 | 161 | 190 | 155 | 184 | 138 | 170 | 75 | 113 |
| Tear Strength, (pli) | 7 | 7 | 13 | 12 | 16 | 14 | 20 | 24 | 33 |
| Compression Set, % | <10 | <10 | <10 | <10 | <10 | <10 | <10 | <10 | <10 |
| Temperature Resistance, % | 45 | 16 | 74 | 33 | 70 | 30 | | | |
| Outgassing, wt. % | <1% | <1% | <1% | <1% | <1% | <1% | <1% | <1% | <1% |
| Fogging | | pass | pass | pass | pass | pass | pass | pass | |
| Flame Resistance | pass | pass | | pass | pass | pass | pass | pass | |

*Comparative prior art examples using similar polyol formulations

Table 3 compares examples of the present invention with prior art examples, wherein the prior art examples have good toughness but higher outgassing and/or flammability ratings.

TABLE 3

| Component | 1 | 10* | 3 | 11* | 5 | 12* | 7 | 13* | 9 |
|---|---|---|---|---|---|---|---|---|---|
| Polyol Side | | | | | | | | | |
| E351 | 23.93 | | | | | | | | |
| 1652 | | | | | | | | | 36.69 |
| PPG 1025 | | | | | | | | | 12.8 |
| PPG 2025/PPG 2000 | 36.3 | | | | 28.67 | | 27.4 | | |
| MPDiol | | | | | | | | | 1.9 |
| MPTD | | | | | | | | | 11.25 |
| Niax 24-32 | | | 40.82 | | | | | | |
| TONE 0201 | 10.8 | | 10.8 | | 10.8 | | 10.8 | | 10.8 |
| DPG | | | | | 7.5 | | 10.8 | | |
| Catalyst | 3.33 | | 3.33 | | 3.33 | | 3.33 | | 3.33 |
| NITAX 34-45 | 2.9 | | 18.16 | | 25 | | 22.8 | | |
| L-5617 | 2.7 | | 2.7 | | 2.7 | | 2.7 | | 2.7 |
| Alumina | 20.1 | | 20.1 | | 20.1 | | 20.1 | | 20.1 |
| 3A Sieve | 2 | | 2 | | 2 | | 2 | | 2 |
| IRGANOX 1135 | 0.12 | | 0.12 | | 0.12 | | 0.12 | | 0.12 |
| IRGANOX 5057 | 0.03 | | 0.03 | | 0.03 | | 0.03 | | 0.03 |
| Pigment | 6.78 | | 9.54 | | 9.54 | | 9.88 | | 9.91 |
| Total Parts | 106.5 | 109.8 | 109.6 | 109.8 | 109.8 | 109.8 | 109.9 | 109.8 | 111.6 |
| Isocyanate | | | | | | | | | |
| MDI 143L | | 19.02 | | 22.92 | | 32.39 | | 43.23 | |
| 751A | 16.33 | | 27.6 | | 32.67 | | 39.74 | | 52.62 |
| OH# | 55.1 | 68.5 | 62.2 | 82.5 | 109.5 | 116.4 | 133.1 | 155.7 | 173.5 |
| Mc | 14881 | 6894 | 9737 | 5500 | 5698 | 4601 | 5195 | 3778 | 4025 |

TABLE 3-continued

| | Sample No. | | | | | | | | |
|---|---|---|---|---|---|---|---|---|---|
| Component | 1 | 10* | 3 | 11* | 5 | 12* | 7 | 13* | 9 |
| Typical Properties | | | | | | | | | |
| Thickness, mm (mils) | (125) | (125) | 125 | 125 | 125 | 125 | 125 | 125 | 125 |
| Density, (pcf) | 20 | 20 | 20 | 20 | 20 | 20 | 20 | 20 | 20 |
| CFD, (psi) | 2.6 | 5.9 | 5.5 | 10 | 10 | 15 | 18 | 55 | 55 |
| Tensile strength, (psi) | 30 | 61.9 | 91 | 105 | 115 | 177 | 189 | 298 | 292 |
| Elongation % | 251 | 171 | 190 | 170 | 184 | 148 | 170 | 131 | 113 |
| Tear Strength, (pli) | 7 | 12 | 13 | 13 | 16 | 19 | 20 | 36 | 33 |
| Compression Set, % | <10 | <10 | <10 | <10 | <10 | <10 | <10 | <10 | <10 |
| Outgassing, wt. % | <1% | >1.5% | <1% | >1.5% | <1% | >1.5% | <1% | >1.5% | <1% |
| Fogging | | Fail | pass | fail | pass | fail | pass | fail | |
| Flame Resistance | pass | Fail | | fail | pass | fail | pass | fail | |

*Comparative prior art examples using similar polyol formulations

As may be seen by reference to the above Table 2, use of alumina trihydrate and low VOC compounds confers flame resistance to the compositions even in the absence of phosphorus- or halogen-containing flame retardants. The use of low VOC components in combination with the absence of phosphorus- or halogen-containing flame retardants further confers low outgassing and low fogging properties to the compositions.

Sample 1 represents a formulation in accordance with the present invention giving rise to a very soft material (typical CFD=2.6), which is nonetheless tough, as reflected by tensile strength, elongation, and tear strength. Samples 2 and 3 have a typical CFD of 5.5, samples 4 and 5 have a typical CFD of 10, samples 6 and 7 have a typical CFD of 18, and samples 8 and 9 have a typical CFD of 55. Samples 1, 3, 5, 7, and 9 were manufactured in accordance with the present invention from formulations comprising an isocyanate component wherein the average value of i (functionality) is 2.2. Comparative samples 2, 4, 6, and 8 (compare to 3, 5, 7 and 9 respectively) were manufactured from formulations comprising an isocyanate component wherein the average value of i (functionality) is 2.3. Comparison of comparative samples 2, 4, 6, and 8 with samples 3, 5, 7, and 9 respectively shows the improved toughness of samples 3, 5, 7, and 9 as reflected by tensile strength, elongation, and tensile strength. These results indicate that use of an isocyanate component wherein the average value of i is 2.2 leads to materials of increased toughness for a variety of active hydrogen component formulations.

Samples 1, 3, 5, 7, and 9 were manufactured in accordance with the present invention from formulations comprising a phenol and amine combination antioxidant package. Comparative samples 2, 4, 6, and 8 (compare to 3, 5, 7 and 9 respectively) were manufactured from formulations comprising BHT as an antioxidant package. Comparison of comparative samples 2, 4, 6, and 8 with samples 3, 5, 7, and 9 respectively shows the improved high temperature resistance of samples 3, 5, 7, and 9 as reflected by % loss in CFD on heat aging at 140° C. for 22 hours. These results indicate that use of a phenol-amine combined antioxidant package leads to materials of increased temperature resistance for a variety of active hydrogen component formulations.

Comparative samples 10, 11, 12, and 13 were manufactured from formulations comprising a carbodiimide based isocyanate component wherein the average value of i (functionality) is 2.15, but has a high level of outgassing. Comparison of comparative samples 10, 11, 12, and 13 with samples 3, 5, 7, and 9 respectively shows the improved outgassing, fogging and flame retardancy at equivalent or improved toughness of samples 3, 5, 7, and 9. These results indicate that use of a non-VOC isocyanate component wherein the average value of i is 2.2 leads to materials of increased toughness for a variety of active hydrogen component formulations.

The data in Table 4 below show that polyurea polyols may also be used to produce tough, fire resistant polyurethane foams.

TABLE 4

| | Sample No. | | | | |
|---|---|---|---|---|---|
| Component | 14 | 15 | 16 | 17 | 18 |
| Polyol Side | | | | | |
| MULTRANOL 9151 | 25 | 25 | 25 | 25 | 25 |
| PPG2025/PPG2000 | 27 | 27.20 | 27.20 | 27.20 | 27.75 |
| MPDiol | 0 | 0.05 | 0.05 | 0.05 | 0 |
| TONE 0201 | 10.8 | 10.8 | 10.8 | 10.8 | 10.8 |
| DPG | 6.5 | 6.25 | 6.25 | 6.25 | 5.75 |
| Catalyst | 6 | 6 | 6 | 6 | 6 |
| L-5617 | 2.7 | 2.7 | 2.7 | 2.7 | 2.7 |
| Alumina | 20 | 20 | 20 | 20 | 17 |
| 3A Sieve | 2 | 2 | 2 | 3 | 5 |
| IRGANOX 1135 | 0.12 | 0.12 | 0.12 | 0.12 | 0.12 |
| IRGANOX 5057 | 0.03 | 0.03 | 0.03 | 0.03 | 0.03 |
| Pigment | 9.75 | 9.75 | 9.75 | 9.75 | 9.75 |
| Total Parts | 110 | 110 | 110 | 111 | 110 |
| Isocyanate | | | | | |
| 751A | 30.60 | 29.05 | 30.22 | 30.22 | 28.94 |
| OH# | 98 | 97 | 97 | 96 | 93 |
| Mc | 6249 | 6445 | 6300 | 6341 | 6460 |
| Typical Properties | 11 | 12 | 13 | 14 | 15 |
| Thickness, mm (mils) | 62 | 62 | 62 | 62 | 62 |
| Density, (pcf) | 20 | 20 | 20 | 20 | 20 |
| CFD, (psi) | 8 | 8 | 9 | 10 | 11 |
| Tensile strength, (psi) | 117 | 115 | 114 | 119 | 123 |
| Elongation, % | 190 | 201 | 192 | 175 | 202 |
| Tear Strength, (pli) | 14 | 12 | 14 | 17 | 17 |
| Compression Set, % | 3 | 4 | 2 | 3 | 2 |
| RDA - G* | 2.14 | 1.76 | 1.79 | 2.00 | 1.93 |
| RDA - loss factor | 0.24 | 0.26 | 0.21 | 0.21 | 0.19 |
| FMVSS/302 | pass | pass | pass | pass | Pass |

Data from samples 19–23 in Table 5 below illustrate that melamine cyanurate in the formulations can also yield tough, fire resistance foams. Data from samples 24–26 illustrate formulations wherein the average value of i is from 2.20 to 2.25.

TABLE 5

| Component | Sample No. | | | | | | | |
|---|---|---|---|---|---|---|---|---|
| | 19 | 20 | 21 | 22 | 23 | 24 | 25 | 26 |
| Polyol Side: | | | | | | | | |
| PPG2025/PPG2000 | 27.75 | 27.75 | 27.75 | 27.75 | 27.75 | 27.75 | 27.75 | 27.75 |
| TONE 0201 | 10.8 | 10.8 | 10.8 | 10.8 | 10.8 | 10.8 | 10.8 | 10.8 |
| DPG | 5.75 | 5.75 | 5.75 | 5.75 | 5.75 | 5.75 | 5.75 | 5.75 |
| Catalyst | 6 | 6 | 6 | 6 | 6 | 6 | 6 | 6 |
| NIAX 34-45 | 25 | 25 | 25 | 25 | 25 | 25 | 25 | 25 |
| L-5617 | 2.7 | 2.7 | 2.7 | 2.7 | 2.7 | 2.7 | 2.7 | 2.7 |
| Alumina | 19 | 18 | 15 | 10 | 20 | 20 | 20 | 20 |
| Melamine cyanurate | 1 | 2 | 5 | 10 | — | — | — | — |
| 3A Sieve | 2 | 2 | 2 | 2 | 2 | 2 | 2 | 2 |
| IRGANOX 1135 | 0.12 | 0.12 | 0.12 | 0.12 | 0.12 | 0.12 | 0.12 | 0.12 |
| IRGANOX 5057 | 0.03 | 0.03 | 0.03 | 0.03 | 0.03 | 0.03 | 0.03 | 0.03 |
| Pigment | 9.75 | 9.75 | 9.75 | 9.75 | 9.75 | 9.75 | 9.75 | 9.75 |
| Total Parts | 110 | 110 | 110 | 110 | 110 | 110 | 110 | 110 |
| Isocyanate | | | | | | | | |
| 751A | 30.14 | 30.14 | 30.14 | 30.14 | — | — | — | — |
| Mondur PF | — | — | — | — | 36 | — | — | — |
| MDI 143L | — | — | — | — | — | 27 | — | — |
| Baytuft 757 | — | — | — | — | — | — | 29 | — |
| PAPI 901 | — | — | — | — | — | — | — | 10 |
| Baytuft 752 | — | — | — | — | — | — | — | 20 |
| OH# | 97 | 97 | 97 | 97 | 97 | 97 | 97 | 97 |
| Mc | 5950 | 5950 | 6080 | 6080 | 26428 | 7081 | 6084 | 5097 |
| Typical Properties | | | | | | | | |
| Thickness (mils) | 62 | 62 | 62 | 62 | 125 | 125 | 125 | 125 |
| Density (pcf) | 20 | 20 | 20 | 20 | 20 | 20 | 20 | 20 |
| CFD (psi) | 11 | 11 | 11 | 12 | 9 | 9 | 10 | 12 |
| Tensile strength (psi) | 115 | 118 | 114 | 127 | 138 | 125 | 114 | 133 |
| Elongation (%) | 158 | 155 | 158 | 166 | 261 | 212 | 174 | 166 |
| Tear Strength (pli) | 14 | 15 | 15 | 15 | 19 | 17 | 13 | 15 |
| Compression Set (%) | 2 | 1 | 0 | 1 | 3 | 22 | 2 | 2 |
| RDA - G* | 1.64 | 1.83 | 1.85 | 1.87 | 1.68 | 1.79 | 1.78 | 1.06 |
| RDA - loss factor | 0.16 | 0.14 | 0.14 | 0.17 | 0.17 | 0.18 | 0.18 | 0.17 |
| FMVSS/302 | pass | pass | pass | pass | pass | pass | pass | pass |

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A flexible polyurethane foam, formed from a foamable composition comprising:
   a low VOC organic polyisocyanate component having an average isocyanate functionality from 2.00 to 2.25, inclusive;
   a low VOC active hydrogen-containing component substantially reactive with the low functionality polyisocyanate to form a polyurethane,
   a surfactant composition; and
   a catalyst composition having substantial catalytic activity in the curing of said foamable composition, wherein the total mass loss of the flexible foam is less than about 1% by weight as measured by ASTM E595 and wherein the foam has a density of about 10 to about 50 pounds per cubic foot.

2. The foam of claim 1, wherein the polyisocyanate component has the formula $Q(NCO)_i$ wherein Q is an aromatic organic radical having the valence of i, and i has an average value from 2.20 to 2.25, inclusive.

3. The foam of claim 2, wherein the organic polyisocyanate component is a polymeric diphenylmethane-4,4'-diisocyanate having an average isocyanate functionality of 2.20.

4. The foam of claim 1, wherein the active hydrogen-containing component comprises a polyether polyol, a grafted polyether polyol, a filled polyether polyol, a polyester polyol, a polyurea polyol, or a combination comprising at least one of the foregoing polyols.

5. The foam of claim 4, wherein the active hydrogen-containing component comprises a polyoxyalkylene diol, a polyoxyalkylene triol, a polyoxyalkylene diol with polystyrene and/or polyacrylonitrile grafted onto the polymer chain, a polyoxyalkylene triol with polystyrene and/or polyacrylonitrile grafted onto the polymer chain, a polyurea polyol, a polyhydrazodicarbonamide polyol, a polyester polyol, or a combination comprising at least one of the foregoing polyols.

6. The foam of claim 4, wherein the active hydrogen-containing component comprises at least two polyoxyalkylene diols of different molecular weights, and a polyester polyol.

7. The foam of claim 4, wherein the active hydrogen-containing component comprises a polyoxyalkylene diol with polystyrene and/or polyacrylonitrile grafted onto the polymer chain, a polyoxyalkylene triol with polystyrene and/or polyacrylonitrile grafted onto the polymer chain, and a polyester polyol.

8. The foam of claim 4, wherein the active hydrogen-containing component comprises a polyoxyalkylene diol, a polyoxyalkylene triol with polystyrene and/or polyacrylonitrile grafted onto the polymer chain, a chain extender diol, and a polyester polyol.

9. The foam of claim 4, wherein the active hydrogen-containing component comprises a polyoxyalkylene diol, a polyoxyalkylene triol, a chain extender diol and a polyester polyol.

10. The foam of claim 4, wherein the active hydrogen-containing component comprises a polyhydrazodicarbonamide polyol, a polyoxyalkylene diol, a chain extender diol and a polyester polyol.

11. The foam of claim 4, wherein the active hydrogen-containing component further comprises a low molecular weight polyhydric alcohol chain extender having a molecular weight from about 80 to about 400.

12. The foam of claim 4, wherein the active hydrogen component comprises an ethylene oxide capped polyether oxide diol having a molecular weight from about 2000 to about 3500; a polyether oxide diol having a molecular weight from about 1000 to about 3000; and a polyester diol having a molecular weight from about 400 to about 600.

13. The foam of claim 7, wherein the active hydrogen-containing component comprises a polyester diol having a molecular weight in the range from about 400 to about 600, and one or a mixture of a polyether diol having polystyrene and polyacrylonitrile grafts and having a molecular weight in the range from about 1500 to about 4000.

14. The foam of claim 7, wherein the active hydrogen-containing component comprises a low molecular weight diol, a polypropylene oxide diol having a molecular weight from about 500 to about 2000, a polypropylene oxide diol having a molecular weight from about 2000 to about 4000, and a polycaprolactone-based diol having a molecular weight from about 400 to about 600.

15. The foam of claim 14, wherein the low molecular weight diol comprises 3-methyl-1,5-pentanediol and 2-methyl-1,3-propanediol.

16. The foam of claim 7, wherein the active hydrogen-containing component comprises a low molecular weight diol having a molecular weight from about 50 to about 250, a polyether oxide diol having a molecular weight from about 1500 to about 4000, a polyester diol having a molecular weight from about 400 to about 600, and a polyether triol having polystyrene and polyacrylonitrile grafts and a molecular weight from about 1500 to about 4000.

17. The foam of claim 1, wherein the hydroxyl number of the non-isocyanate components is in the range from about 28 to about 1250.

18. The foam of claim 1, wherein the ratio of the equivalents of isocyanate in the polyisocyanate to the equivalents of active hydrogen in the active hydrogen-containing component is from about 0.8 to about 1.2.

19. The foam of claim 1, wherein the ratio of the equivalents of isocyanate in the polyisocyanate to the equivalents of active hydrogen in the active hydrogen-containing component is from about 1.0 to about 1.05, inclusive.

20. The foam of claim 1, wherein the surfactant composition, the catalyst composition, or both, are low VOC.

21. The foam of claim 1, further comprising a filler.

22. The foam of claim 1, further comprising a low VOC filler.

23. The foam of claim 1, further comprising a flame retardant filler.

24. The foam of claim 23, wherein the flame retardant filler is a low VOC, non-halogenated filler.

25. The foam of claim 1, further comprising an acrylic overcoat.

26. The foam of claim 1, further comprising a low VOC antioxidant composition.

27. The foam of claim 1, wherein the foam passes FMVSS 302.

28. The foam of claim 1, having the following properties:

| | |
|---|---|
| 25% CFD (psi) | 1–4 |
| Tensile strength (psi) | >25 |
| Elongation (%) | >200 |
| Tear strength (pli) | >7. |

29. The foam of claim 1, having the following properties:

| | |
|---|---|
| 25% CFD (psi) | 4–8 |
| Tensile strength (psi) | >75 |
| Elongation (%) | >170 |
| Tear strength (pli) | >7. |

30. The foam of claim 1, having the following properties:

| | |
|---|---|
| 25% CFD (psi) | 8–12 |
| Tensile strength (psi) | >105 |
| Elongation (%) | >160 |
| Tear strength (pli) | >12. |

31. The foam of claim 1, having the following properties:

| | |
|---|---|
| 25% CFD (psi) | 16–20 |
| Tensile strength (psi) | >150 |
| Elongation (%) | >140 |
| Tear strength (pli) | >15. |

32. The foam of claim 1, having the following properties:

| | |
|---|---|
| 25% CFD (psi) | 30–60 |
| Tensile strength (psi) | >280 |
| Elongation (%) | >80 |
| Tear strength (pli) | >25. |

33. The foam of claim 1, wherein the total mass loss of the foam is less than about 0.8% by weight as measured by ASTM E595.

34. A flexible polyurethane foam, formed from a foamable composition consisting essentially of
   a low VOC organic polyisocyanate component having an average isocyanate functionality from 2.00 to 2.25, inclusive;
   a low VOC active hydrogen-containing component substantially reactive with the low functionality polyisocyanate to form a polyurethane,
   a low VOC surfactant;
   a low VOC, non-halogenated flame retardant filler; and
   a low VOC catalyst having substantial catalytic activity in the curing of said foamable composition, wherein the total mass loss of the flexible foam is less than about 1% by weight as measured by ASTM E595, the foam passes MVSS 302, and the foam has a density of about 10 to about 50 pounds per cubic foot.

35. The foam of claim 34, wherein the total mass loss of the foam is less than about 0.8% by weight as measured by ASTM E595.

36. A flexible polyurethane foam, formed from a foamable composition consisting essentially of
- a low VOC organic polyisocyanate component having an average isocyanate functionality from 2.00 to 2.25, inclusive;
- a low VOC active hydrogen-containing component substantially reactive with the low functionality polyisocyanate to form a polyurethane,
- a low VOC surfactant;
- a low VOC, non-halogenated flame retardant filler;
- a low VOC antioxidant package; and
- a low VOC catalyst having substantial catalytic activity in the curing of said foamable composition, wherein the total mass loss of the flexible foam is less than about 1% by weight as measured by ASTM E595, the foam passes FMVSS Standard 302, and the foam has a density of about 10 to about 50 pounds per cubic foot.

37. The foam of claim 36, wherein the total mass loss of the foam is less than about 0.8% by weight as measured by ASTM E595.

38. A flexible polyurethane foam, formed from a foamable composition consisting essentially of
- a low VOC organic polyisocyanate component having an average isocyanate functionality from 2.00 to 2.25, inclusive;
- a low VOC active hydrogen-containing component substantially reactive with the low functionality polyisocyanate to form a polyurethane,
- a low VOC surfactant;
- a low VOC, non-halogenated flame retardant filler; and
- a low VOC catalyst having substantial catalytic activity in the curing of said foamable composition, wherein the total mass loss of the flexible foam is less than about 1% by weight as measured by ASTM E595, the foam has a density of about 10 to about 50 pounds per cubic foot, the foam passes MVSS 302, and further wherein the foam has the following properties:

| | |
|---|---|
| 25% CFD (psi) | 1–4 |
| Tensile strength (psi) | >25 |
| Elongation (%) | >200 |
| Tear strength (pli) | >7. |

39. The foam of claim 38, having the following properties:

| | |
|---|---|
| 25% CFD (psi) | 4–8 |
| Tensile strength (psi) | >75 |
| Elongation (%) | >170 |
| Tear strength (pli) | >7. |

40. The foam of claim 38, having the following properties:

| | |
|---|---|
| 25% CFD (psi) | 8–12 |
| Tensile strength (psi) | >105 |
| Elongation (%) | >160 |
| Tear strength (pli) | >12. |

41. The foam of claim 38, having the following properties:

| | |
|---|---|
| 25% CFD (psi) | 16–20 |
| Tensile strength (psi) | >150 |
| Elongation (%) | >140 |
| Tear strength (pli) | >15. |

42. The foam of claim 38, having the following properties:

| | |
|---|---|
| 25% CFD (psi) | 30–60 |
| Tensile strength (psi) | >280 |
| Elongation (%) | >80 |
| Tear strength (pli) | >25. |

43. A flexible polyurethane foam, formed from a foamable composition consisting essentially of
- a low VOC organic polyisocyanate component having an average isocyanate functionality from 2.00 to 2.25, inclusive;
- a low VOC active hydrogen-containing component substantially reactive with the low functionality polyisocyanate to form a polyurethane,
- a low VOC surfactant;
- a low VOC, non-halogenated flame retardant filler,
- a low VOC antioxidant package; and
- a low VOC catalyst having substantial catalytic activity in the curing of said foamable composition, wherein the total mass loss of the flexible foam is less than about 1% by weight as measured by ASTM E595, the foam has a density of about 10 to about 50 pounds per cubic foot, the foam passes MVSS 302, and further wherein the foam has the following properties:

| | |
|---|---|
| 25% CFD (psi) | 1–4 |
| Tensile strength (psi) | >25 |
| Elongation (%) | >200 |
| Tear strength (pli) | >7. |

44. The foam of claim 43, having the following properties:

| | |
|---|---|
| 25% CFD (psi) | 4–8 |
| Tensile strength (psi) | >75 |
| Elongation (%) | >170 |
| Tear strength (pli) | >7. |

45. The foam of claim 43, having the following properties:

| | |
|---|---|
| 25% CFD (psi) | 8–12 |
| Tensile strength (psi) | >105 |
| Elongation (%) | >160 |
| Tear strength (pli) | >12. |

46. The foam of claim 43, having the following properties:

| | |
|---|---|
| 25% CFD (psi) | 16–20 |
| Tensile strength (psi) | >150 |
| Elongation (%) | >140 |
| Tear strength (pli) | >15. |

47. The foam of claim 43, having the following properties:

| | |
|---|---|
| 25% CFD (psi) | 30–60 |
| Tensile strength (psi) | >280 |
| Elongation (%) | >80 |
| Tear strength (pli) | >25. |

48. A method of forming a tough fire retardant flexible polyurethane foam, comprising reacting a low VOC organic polyisocyanate component, wherein the polyisocyanate component has an isocyanate functionality from 2.00 to 2.25 with a mixture comprising
   a low VOC active hydrogen-containing component substantially reactive with the low functionality polyisocyanate to form a polyurethane,
   a surfactant composition; and
   a catalyst composition having substantial catalytic activity in the curing of said foamable composition;

dispersing an inert gas throughout the reacted mixture by mechanically beating the mixture to form a froth; and curing the froth mixture to form a cured polyurethane flexible foam, wherein the total mass loss of the foam is less than about 1% by weight as measured by ASTM E595, and the foam has a density of about 10 to about 50 pounds per cubic foot.

49. The foam of claim 22, wherein the filler is melamine cyanurate, alumina trihydrate, or a mixture comprising at least one of the foregoing fillers.

* * * * *

UNITED STATES PATENT AND TRADEMARK OFFICE
CERTIFICATE OF CORRECTION

PATENT NO. : 6,559,196 B2
APPLICATION NO. : 09/893744
DATED : May 6, 2003
INVENTOR(S) : Scott Simpson et al.

It is certified that error appears in the above-identified patent and that said Letters Patent is hereby corrected as shown below:

Title Page:
Item (56), References Cited, after "2,866,744", delete "Askay" and insert therefor --Askey--;

Columns 13/14:
Table 2, after "density,", delete "(pet)" and insert therefor --(pcf)--;
Table 2, after "Temperature Resistance, %", delete "45";
Table 2, after "45", delete "16,74,33,70,30" and insert therefor --45,16,74,33,70,30--;
Table 3, delete "NITAX 34-45" and insert therefor --NIAX 34-45--;

Column 17:
Line 58, after "and", insert --further--;

Column 20:
Line 63, after "passes", delete "MVSS" and insert therefor --FVMVSS--;

Column 21:
Line 36, after "passes", delete "MVSS" and insert therefor --FVMVSS--;

Column 22:
Line 36, after "passes", delete "MVSS" and insert therefor --FVMVSS--;

Column 24:
Line 16, after "and", insert --wherein--.

Signed and Sealed this

Fifth Day of June, 2007

JON W. DUDAS
*Director of the United States Patent and Trademark Office*